4/10/84 XR 4,442,426

United States Patent [19]

Heuschmann et al.

[11] 4,442,426

[45] Apr. 10, 1984

[54] SIGNAL TRANSMISSION

[75] Inventors: Herr F. Heuschmann, Munich; Herr A. Plank, Kolbermoor, both of Fed. Rep. of Germany

[73] Assignee: Compur-Electronic GmbH, Munich, Fed. Rep. of Germany

[21] Appl. No.: 231,548

[22] Filed: Feb. 4, 1981

Related U.S. Application Data

[63] Continuation of Ser. No. 4,243, Jan. 17, 1979, abandoned.

[30] Foreign Application Priority Data

Jan. 18, 1978 [DE] Fed. Rep. of Germany ....... 2802075

[51] Int. Cl.³ ......................... G08B 1/08; H04Q 7/00

[52] U.S. Cl. ............................... 340/539; 340/870.11; 340/870.14; 340/825.14; 455/51; 455/67; 455/115; 455/65

[58] Field of Search ......... 340/539, 179, 182, 147 SY, 340/150, 345, 346, 825.06, 825.69, 825.14, 825.72, 870.09, 870.11, 870.13, 870.14, 870.16; 455/51, 67, 78, 90, 103, 115, 127, 128, 53, 63, 65, 101, 54, 56; 375/23, 106-113, 121; 371/46, 47; 370/84

[56] References Cited

U.S. PATENT DOCUMENTS

| | | | |
|---|---|---|---|
| 3,541,552 | 11/1970 | Carlson | 340/147 SY |
| 3,593,138 | 7/1971 | Dunn et al. | 455/51 |
| 3,786,419 | 1/1974 | Nick | 375/107 |
| 4,013,959 | 3/1977 | Patterson | 340/346 |
| 4,101,872 | 7/1978 | Pappas | 340/539 |

*Primary Examiner*—Donnie L. Crosland
*Attorney, Agent, or Firm*—Flynn, Thiel, Boutell & Tanis

[57] ABSTRACT

Plural transmitters, which transmit signals to a common receiver, transmit their signals in a fixed time-staggered pattern. As a result, the individual signals which are transmitted by the respective transmitters do not interfere with one another or influence one another. Between the fixed time-staggered signals, which are sent out, for example, as standard signals to facilitate routinelike monitoring, signals of a higher priority, for example alarm signals, can be transmitted without any time delay. This is particularly suited for use in connection with a personal security and monitoring system, in which the function monitoring of the unit and the wireless connection between several transmitters and a receiving center must constantly be monitored, and signals of a higher priority, namely alarm signals, are transmitted without delay.

16 Claims, 5 Drawing Figures

SIGNAL TRANSMISSION

This is a continuation, of application Ser. No. 4 243, filed Jan. 17, 1979, now abandoned.

FIELD OF THE INVENTION

This invention relates to a method of transmitting a plurality of information signals in a common carrier frequency range from different transmitters to a receiver.

BACKGROUND OF THE INVENTION

German Offenlegungsschrift No. 2532504 discloses a personal security and surveyance or monitoring arrangement in which the person to be surveyed has a mobile transmitter which sends out an alarm signal which is received at a central control point and there sets off an alarm. When a central control point is to be used for a plurality of transmitters there is a danger that there could be interference between the alarm signals sent out from the different transmitters, and it is not possible to have an unambiguous co-ordination with a particular transmitter of an alarm signal received at the central control point. Moreover this arrangement and the signal transmission is not continuously supervised as regards its functioning capacity, whereby a troublefree reliable operation is not ensured.

German Offenlegungsschrift No. 2531664 discloses a circuit arrangement for signal safety, that is to say for supervising the functioning in the transmission of a signal. In this circuitry a neutral signal of a specific form is transmitted to the receiver during a rest condition, particularly on an occasion when no alarm signal is transmitted, and this neutral signal is switched off when any interference or alarm occurs, and in this event a signal of different form is sent out. In this case there is certainly a continuous supervision of the functioning of the transmitters and the signal transmission, but the neutral signal which is continuously transmitted consumes a relatively large amount of energy, so that this arrangement is not suitable for mobile transmitters which for example are used in personal security units, in which cases small and light transmitter units with small batteries or accumulators are important. Apart from the energy-consumption considerations the continuously transmitted signals when a plurality of transmitters are in use would cause mutual interference, and consequently a safe and reliable supervision of the functioning of an arrangement which includes a plurality of transmitters would not be possible.

The present invention is based on the object of affording a method and providing arrangements which cater for the transmission of different information signals between a plurality of transmitters and a receiver station on one transmission channel.

SUMMARY OF THE INVENTION

The present invention provides a method of transmitting a plurality of information signals on a common carrier frequency range from different transmitters to one receiver wherein the points in time at which the individual transmitters send out information signals are derived from a time base common to the transmitters and the information signals of the individual transmitters are sent out staggered timewise in relation to one another and in a manner identifying the transmitter. In other words, information signals are sent by the individual transmitters according to a strict, rigid timing schedule.

In accordance with a preferred embodiment each transmitter has its own time base circuits which are synchronized with an accurate master time basis which is common to the transmitters. The time based circuits may preferably be synchronized with normal time. The synchronization of the transmitter-related time-base circuits may either be staggered in time or may be simultaneous, in which latter case the time base circuit in the transmitter is connected with a stage which carries out the time-staggering specific to the particular transmitter. Advantageously the time base circuit can give out the synchronization pulses cyclically.

A predetermined staggering of the time of transmission from the individual transmitters means a specific correlation of the signals sent out from the transmitters. To make the method of this invention even more safe particularly when used in personal security arrangements and to ensure an absolutely safe functioning of the system, the information signals put out by the individual transmitters may be coded in a manner specific to the individual transmitters. Preferably variably coded 5-note-frequency series are used as the code signals for identifying the different transmitters. The time-staggered radiation of the information signals of the individual transmitters may always be repetitive in a cycle.

The aforesaid transmitter-identifying time-staggered information signals are advantageously sent out in a routine fashion as standard signals for surveyance or monitoring. In accordance with a further feature of the invention information, signals of greater priority are transmitted as special signals, for example as alarm signals immediately after the occurence between two chosen standard signals in a type of time multiplex process. This ensures that the information signals of greater priority do not interfere with the time-staggered station identifying routine standard signals, and vice versa, and in consequence an immediate transmission of an information signal of greater priority ensuing, for example an alarm signal, becomes possible. The information signals of greater priority may put out a plurality of successive transmission pauses between the time-staggered routine or standard signals, which ensures that the receiving station will respond in every case to the alarm signal.

In accordance with a further very advantageous feature of the invention, the information signal of greater priority, immediately as it occurs will be sent out in the aforesaid pauses over a specific time lapse, for example during 5 pauses. Then the transmission of the information signals of greater priority will be eliminated in the further pauses so that the latter are free for the transmission of further possible information signals of greater priority which might be sent by another transmitter. To enable, however, the receiver station to be notified that an information signal of greater priority is correct at a specific transmitter, or will occur, after the occurrence of the information signal of greater priority in a number of pauses, this greater priority information signal will then be sent out subsequently in place of the standard signal specific to the transmitter concerned. In this way the identification of the alarm over a long period at the spot is ensured even in the case of a multiple alarm situation.

The information signals of greater priority can be coded in a manner typifying the individual transmitters. Preferably for the information signals of greater priority differently coded 5-note-frequency series are used.

When the methods of this invention are used in connection with a personal security and surveyance system, the time-staggered transmitter-related information signals are used as surveyance signals for monitoring the functioning of the system and the radio link, and the information signals of greater priority are used as alarm signals. If a transmitter unit, which includes the transmitter, the transmitter time-base circuit and the energy supply arrangment, is not used, this is plugged into a central unit or central supervision station and there stowed, and then during this rest period of the transmitter, the time base circuit is synchronized by the master time base circuit installed in the central unit. Preferably the transmission of the surveyance signals will be automatically eliminated during the stowage of the transmitter unit. At the same time the energy supply arrangement of the transmitter unit can be recharged during the period when the transmitter unit is stowed in the central unit.

In an arrangement which is provided in this invention and used to carry out the method of the invention, a frequency-stable transmitter time base circuit is disposed in each transmitter in order to provide a transmitter-identifying time-staggered routine transmission of information signals. If the transmitter time base circuits are simultaneously synchronized by a master time base circuit, a coded comparator circuit is connected with the transmitter time base circuit in order to call up the time-staggering of the point of emission of the individual transmitter. In accordance with a preferred embodiment of the invention, the transmitter time-base circuit comprises a quartz clock with a coded comparator circuit connected therewith.

In an arrangement for carrying out the method of this invention in relation to a personal security and surveyance system, the central unit comprises the receiver, the master time base circuit, and a synchronization pulse stage connected in series with the master time base circuit and providing the synchronization pulses for the individual transmitter units. Advantageously a stowage board is provided in the central unit for each transmitter unit. Where a transmitter unit is to be stowed, it is pushed or plugged into the stowage board, an electrical connection then being made between the transmitter-related time base circuit and the synchronization pulse stage, and between the energy supply arrangement of the transmitter units and an energy supply aggregate of the central unit, when this stowage and plug-in operation takes place. Preferably the synchronization pulse stage produces in the central unit time-staggered synchronization pulses which are associated with the relevant transmitter units, so that the transmitter-related time base circuits are appropriately synchronized as regards the time point of signal radiation related to the transmitters concerned.

BRIEF DESCRIPTION OF THE DRAWINGS

The present invention is further described hereinafter, by way of example, with reference to the accompanying drawings in which.

DETAILED DESCRIPTION

Figure 1:
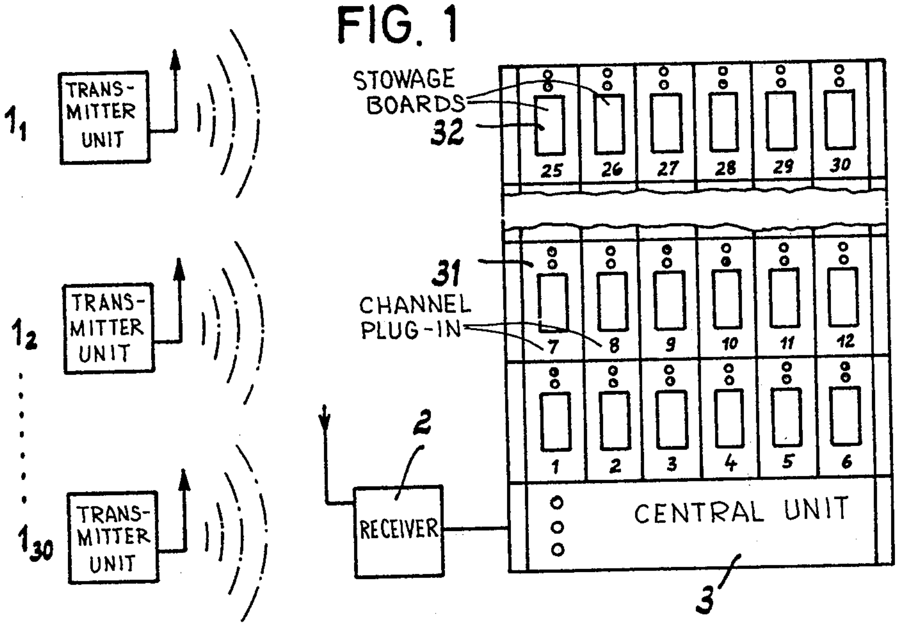
FIG. 1 is a diagrammatic overall illustration of a personal security and surveyance or monitoring system with thirty transmitter units, one receiver and a central unit with stowage boards.

Indicated diagrammatically in FIG. 1, transmitter units $1_1, 1_2 \ldots 1_{30}$, and the information signals sent out thereby are received by a receiver 2 which is connected to a central unit 3. The receiver 2 can be integrated in the housing of the central unit 3. The central unit 3 has channel plug-ins 31 corresponding in number to that of the transmitter units 1, and an appropriate number of stowage boards 32 are there included. When a person to be supervised or checked for security has finished his work, he plugs his transmitter unit in the storage board 32 of the corresponding channel plug-in 31 of the central unit 3. When the person concerned starts work again or begins a new shift, he takes his transmitter unit 1 from the stowage board 32 again and carries it to his workpiece. The devices which raise the alarm may, depending on circumstances, be constituted in various forms, for example that of a clock, and the remaining circuitry arrangements, batteries or accumulators and the transmitters are prefereably incorporated in a utility unit which the person to be under supervision carries with him and this unit is connected to the alarm trigger.

Figure 2:
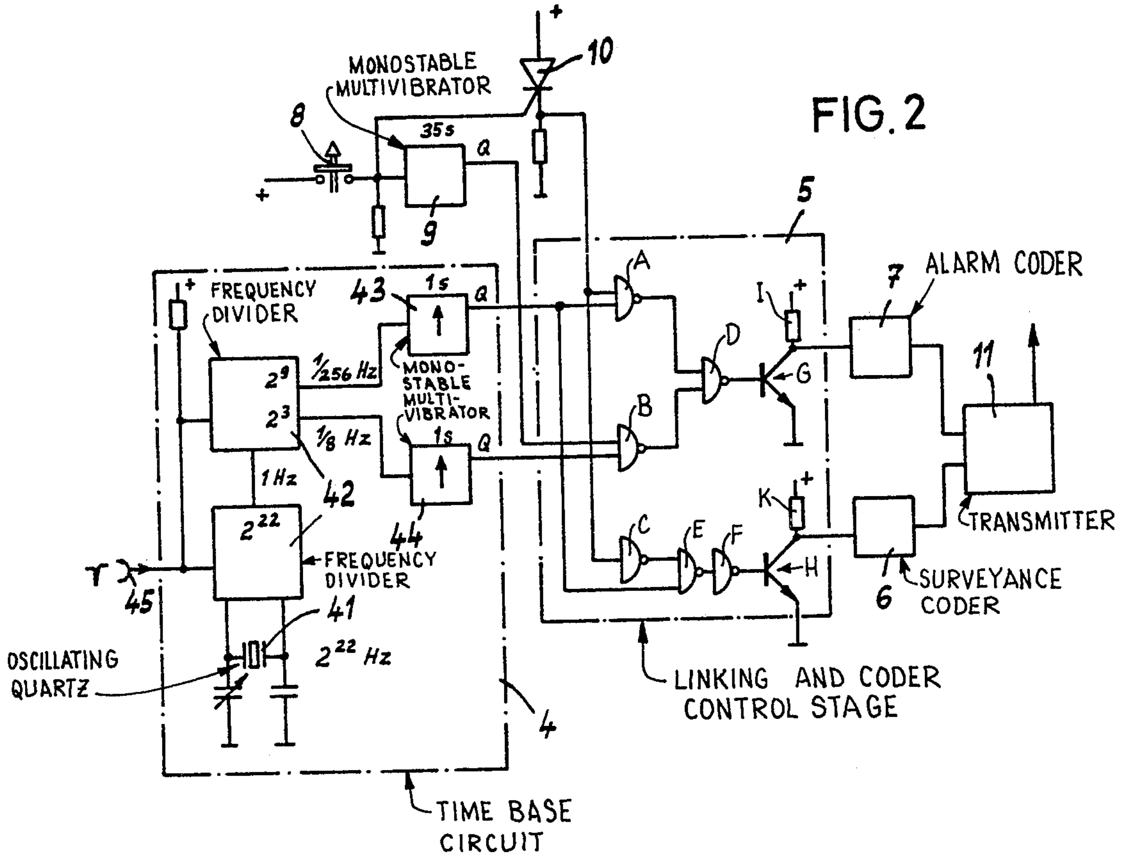
FIG. 2 is a circuit diagram of a transmitter unit.

The circuit illustrated in FIG. 2, as an example of the transmitter unit, has a time base circuit 4 with an oscillating quartz 41 and frequency divider 42, which provides at a monostable multivibrator 43 a signal, for example every 256 seconds, and at a further monostable multivibrator 44, for example every 8 seconds a trigger signal, so that the monostable multivibrator 42 provides at the Q-output every 256 seconds a signal with a pulse duration of for example 1 second and at the monostable multivibrator 44 every 8 seconds a pulse with a pulse duration of for example of again 1 seconds. The aforesaid circuit parts are combined in the time base circuit 4. The frequency divider 42 can be reset through an input 45 so that the signal arriving at the input 45 from a master time base circuit synchronizes the transmitter-related time base circuit 4. This is the case when the transmitter unit is stowed in the stowage board 32 of the central unit 3, so that the central unit 3 provides the reset signals of the transmitter-related time base circuit 4 through the input 45.

When an alarm situation occurs, that is to say when the alarm stage 8 is closed, a further monostable multivibrator 9 is triggered and this imparts to a link and code control stage 5 a signal with a pulse duration of, for example 35 seconds. The alarm signal applied at the input of the monostable multi-vibrator 9 passes—possibly through triggers of a thyristor 10—likewise to the linking and code-imparting stage 5. Depending on the control provided by the code control stage 5, the surveyance coder 6 and the alarm coder 7 each apply codes at the transmitter 11 for transmission.

More specifically, and referring to FIG. 2, the cathode of the thyristor 10 is connected to one input terminal of a first NAND-gate A, the other input terminal of which is connected to the Q-output of the monostable multivibrator 43. The Q-output of the monostable multivibrator 9 is connected to one input terminal of a second NAND-gate B, the other input terminal of which is connected to the Q-output of the monostable multivibrator 44. The input of a first inversion gate C is connected to the cathode of the thyristor 10. The output of the inversion gate C is connected to one input of a third NAND-gate E, the other input terminal of which is connected to the Q-output of the monostable multivibrator 43. The output of the third NAND-gate E is connected to the input of a second inversion gate F, the output of which is connected to the base electrode of the transistor H, its emitter is grounded and its collector is connected to the positive terminal of an electrical source via working resistance K. The collector of the driver transistor H is connected to the input of the surveyance coder 6. A fourth NAND-gate D receives the output of the first NAND-gate A as well as the output of the second NAND-gate B. The output of the fourth NAND-gate D is connected to the base electrode of a second driver transistor G, the emitter of which is grounded and the collector of which is connected to the positive terminal of an electrical source via a working resistance I. The collector of the driver transistor G is connected to the input of the alarm coder 7.

The coders 6 and 7, for example, impart differently coded 5-note-frequency series. The surveyance coder 6 gives a code for the surveying or monitoring of the system and the alarm coder 7 a code for an alarm, should the protected person be in danger. The stage 5-note-frequency sets coders are presently available in commerce. The transmitter 11 then radiates these 5-note-frequency sets in a carrier frequency band of for example 468.32 to 469.18 MHz. This carrier frequency band applies to all the transmitter units of a personal security system.

The time relationship of the information signals produced by the individual circuits illustrated in FIG. 2 will now be described from the signal diagrams which are illustrated in FIGS. 3*a* to *e*.

Figure 3:
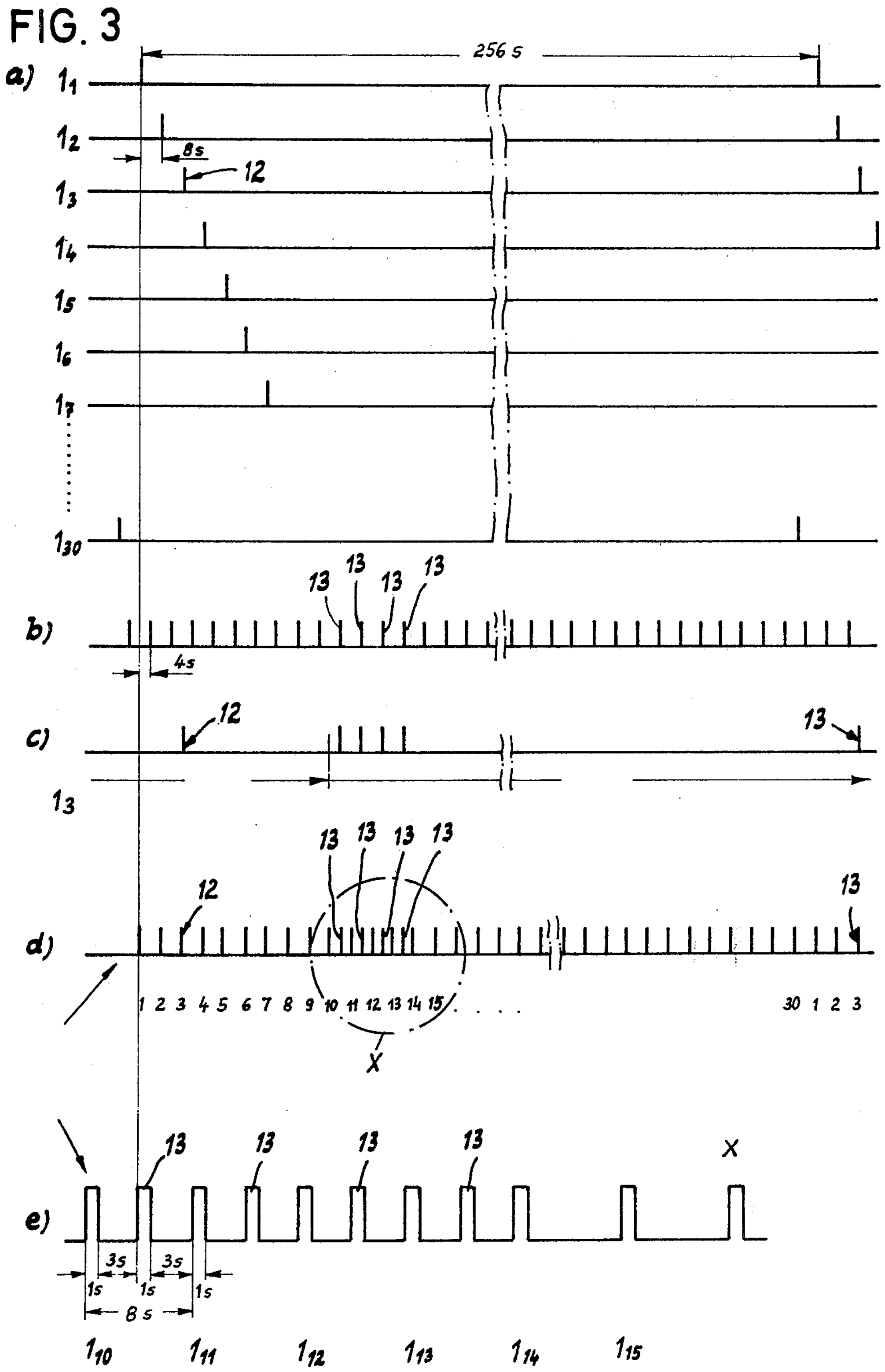
FIG. 3*a* to 3*e* are diagrams used to explain the method of this invention and to reproduce the time correlation of the individual information signals sent out by the transmitters.

FIG. 3*a* diagrammatically represents the way in which the surveyance or monitoring signals put out by the individual transmitter units $1_1$ to $1_{30}$ are staggered timewise. Where there is no alarm, the surveyance coder 6 puts out, through the monostable multivibrator 43 in the time base circuit 4 a coded surveyance signal of a period of 1 second every 256 seconds. The linking and coder control stage 5 then when there is no alarm, does not operate the alarm coder 7 and there is, of course, no alarm. The individual transmitter units transmit this surveyance signal, staggered by 8 seconds as shown by FIG. 3*a*. This ensures that the surveyance signals of the various transmitter units do not occur simultaneously and interfere with one another so that a safe and untroubled appraisal and association with the transmitter units is possible at the central unit 3. This time staggering also serves for identification of the individual transmitter units. In addition, further safety in this respect is ensured by the differently coded 5-note-frequency sets of the surveyance signals of the individual transmitter. The surveyance signals of the individual transmitter units arrive, in succession in the example now discussed, with a time delay of 8 seconds. The period of transmission of the surveyance signal being 1 second, there is on each occasion a transmission pause of 7 seconds between the transfer of the individual surveyance signals. This carry-over pause is used to transmit any alarm signal which may occur.

FIG. 3*b* shows diagrammatically alarm signals which occur at every 8 seconds, these however being staggered in relation to the occurrence of the surveyance signals by for example 4 seconds, so that these alarm signals only fall in the transition pauses in the surveyance signals.

FIG. 3*c* illustrates the timed occurrence of, for example, the surveyance and alarm signals for the transmitter $1_3$. In the rest condition, that is to say when there is no alarm situation, the transmitter as described puts out every 256 seconds the surveyance signal of 1 second duration, and there is no alarm signal. If an alarm situation occurs, the monostable multivibrator of the time base circuit 4, in combination with the linking and coder control stage 5 brings about immediately or in the next pause in the surveyance an alarm signal in each case of 1 second length at intervals of 8 seconds. The monstable multivibrator 43 with the time constant of 35 seconds will be maintained, so that in this example four alarm signals 13 are put out (see FIGS. 3*d* and 3*e*). Thereafter no further alarm signals 13 will be sent out so that the subsequently ensuing surveyance signal pauses are free for the application of alarm signals, for example, sent out by another transmitter unit. However, to enable the central unit to be advised that there is an alarm at the transmitter unit $1_3$, at the time when normally the surveyance signal 12 of the transmitter 3 will be sent, the alarm signal 13 will thereafter be sent out (see right side of FIG. 3*d*) to advise of the alarm condition. As a result, the attention of the central unit will continue to be drawn repetitively to the alarm condition of the transmitter unit $1_3$ so long as this alarm situation is not removed at the transmitter unit $1_3$ or the transmitter unit $1_3$ is reset in the alarm respect.

FIG. 3*d* shows the sequence of signals received at the receiver if for example the transmitter $1_3$ has the alarm situation described above. FIG. 3*e* reproduces section X of FIG. 3*d* in order to clarify the time sequence of the surveyance and alarm signals. The diagram of FIG. 3*d* contains every surveyance signal of the transmitter units $1_1$ to $1_{30}$ which are staggered timewise by 8 seconds, and the alarm signals 13 of the transmitter unit $1_3$ which occur between the surveyance signals of the transmitter units $1_{10}$ and $1_{11}$, $1_{11}$ and $1_{12}$, and $1_{12}$ and $1_{13}$ and $1_{13}$ and $1_{14}$. When the alarm signal occurs at the point in time in which the surveyance signal 12 is sent normally from the transmitter $1_3$, the alarm signal 13 of transmitter $1_3$ is sent.

The section of the diagram of FIG. 3*d* which is given in FIG. 3*e* reproduces again the sequence of the surveyance and pulse signals on a larger scale. After the transmitter $1_{10}$ has radiated its surveyance signal the alarm signal 13 of transmitter $1_3$ falls in the subsequent surveyance signal pause up to the sending of the surveyance signal of transmitter $1_{11}$. As has been indicated, between the occurrence of the surveyance signal transmitter unit $1_{10}$ and the occurrence of the alarm signal 13 of the conveyor unit $1_3$, and between the occurrence of the alarm signal 13 of the transmitter unit $1_3$ and the occurrence of the surveyance signal of the transmitter unit $1_{11}$, there is in each case an interval in time of 3 seconds. Based on the foregoing, it is clear that the surveyance and alarm signals are sent by the individual transmitters according to a strict, rigid timing schedule. Any interference between the surveyance and alarm signals is therefore impossible. The time intervals, pulse durations and repetitions are determined in the example given above by the choice of the time constants of the monostable multivibrator 43 and 44, the transmitter-related time basis unit 4 and the time constants of the monostable multivibrator 9. It will be understood that these time values can be varied as required by appropriate choice of these monostable multivibrators and their time constants, should this be necessary or desirable.

Figure 4:
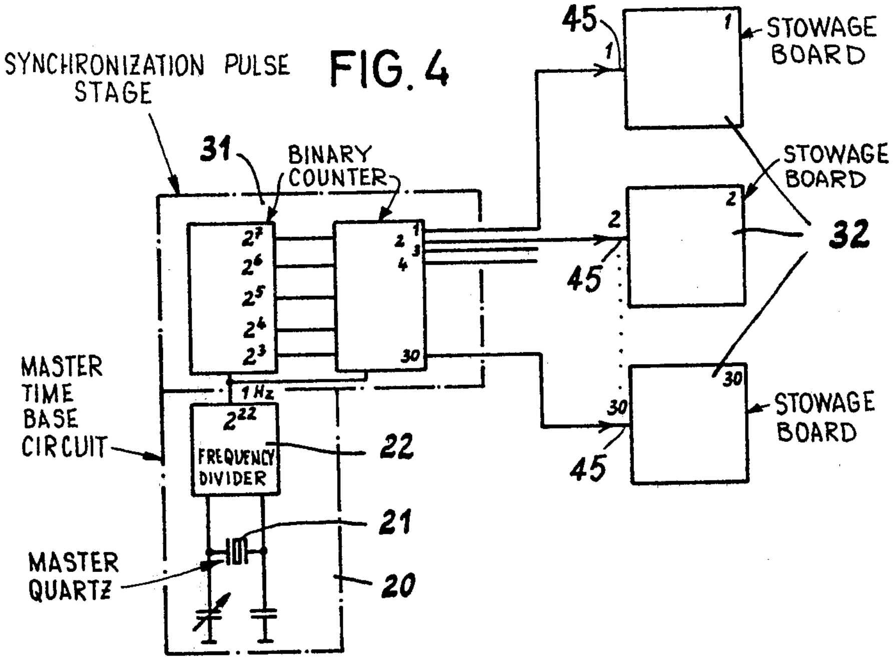
FIG. 4 illustrates an embodiment of the central time base circuit and the synchronization pulse stage in the central unit.

To ensure that the time interval between the surveyance signals of the individual transmitter units, and between any alarm signals which might occur and the surveyance signals, do not vary, and to compensate for any drifting of the quartz time base, the time base circuits 4 of the individual transmitter units must be set to a common time basis. To carry out this synchronization, the central unit—as illustrated in FIG. 4—has a central or master time base circuit 20 with a master quartz 21 and a frequency divider stage 22 which sets the quartz frequency to 1 Hz. Connected to the master time base circuit 20 is a synchronization pulse stage 31 comprising binary counters and having outputs corresponding in number to that of the transmitter units and connected through terminals to the appropriate terminal 45 of the individual transmitter unit when a transmitter unit is plugged into the stowage board. During stowage, the transmitter-related time base circuits 4 are synchronized by the master time base circuit 20 of the central unit 3 in such a way as to maintain the surveyance or monitoring signal pauses of 8 seconds.

The transmitter units are carried by the person to be supervised normally during the work period, that is to say not longer than about ten hours and then deposited in the stowage board. The transmitter units thus remain separated from the central unit at the most for ten hours. Thus quartz or circuits associated with the quartz having a frequency stability not greater than ±1 second, need, therefore, only be used as transmitter-related oscillating quartzes. This ensures that any alarm signals which occur cannot overlap the surveyance signals and any mutual interference effect of the signals is eliminated. The reset pulses which occur at the outputs of the synchronization pulse stage 31 are in each case staggered by 8 seconds so that the transmitter units after stowage in the stowage board 32 are synchronized in a defined time interval, namely in each case at a time interval of 8 seconds. The synchronization of the individual transmitter units thus takes place automatically after deposit in the stowage board 32. The stowage board may moreover have a terminal which is contacted with the transmitter unit when the latter is plugged into the stowage board 32 and is used for charging the energy supply arrangement, for example an accumulator, in the transmitter unit.

Figure 5:
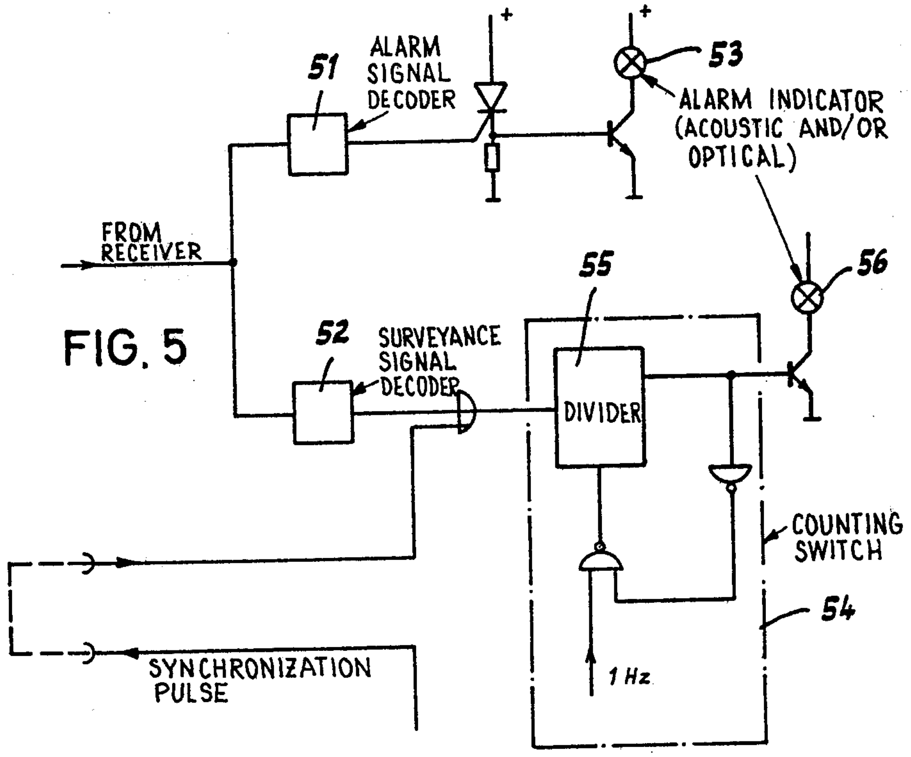
FIG. 5 illustrates an example of embodiment of a channel plug-in and stowage board and indicator arrangement for an individual transmitter unit.

FIG. 5 shows the circuitry of a channel plug in 31 of the central unit 3. This circuit arrangement carries out the decoding of the incoming coded surveyance and alarm signals, and processes these further.

The incoming surveyance and alarm signal mixture is decoded in the decoders 51 and 52. When the transmitter unit associated with the channel plug-in puts out an alarm signal a signal is emitted at the output of the alarm decoder 51 which sets off an acoustic and/or optical alarm indicator 53. The surveyance signal decoder 52, on occurrence of the surveyance signal, coming from the transmitter unit associated with this channel plug-in gives an alarm signal which is conducted to the reset pulse of the divider 55 of the counting switch 54. If the counter switch 54 does not reset for a predetermined time, that is to say when in a specified interval for example within 8.5 min. no surveyance signal arrives, the counting switch 54 releases for this channel plug-in an optical and/or acoustical surveyance signal.

When the transmitter unit is plugged into the stowage board, the synchronization pulses generated at the synchronization stage 31 of the central unit 3 pass through the stowed transmitter unit as reset pulses to the counting switch 54 so that this switch is automatically reset each time a transmitter unit is stowed and the routine surveyance signal transmission is automatically cut off.

The embodiments of the invention in which an exclusive property or privilege is claimed are defined as follows:

1. A security and monitoring method in a wireless information system which includes receiving means and plural separate transmitting means, comprising the steps of:

transmitting from each of said plural and separate transmitting means to said receiving means a monitoring signal of predetermined duration at a fixed repetition rate, the period of said repetition rate being an integer multiple of a first fixed interval of time;

synchronizing said plural transmitting means to transmit said respective monitoring signals so that any two successive said monitoring signals transmitted by respective said transmitting means are spaced in time by a respective delay interval which is an integer multiple of said first fixed interval of time; and sending alarm signals separate from said monitoring signals and of predetermined duration to said receiving means, each said alarm signal being transmitted during a respective said delay interval and at a point in time spaced a second fixed interval of time after transmission of a respective said monitoring signal by a respective said transmitting means;

whereby said monitoring and alarm signals are transmitted by said plural transmitting means according to a rigid timing schedule and all said monitoring signals and said alarm signals of each said transmitting means are free of interference with said monitoring signals of other of said transmitting means.

2. The security and monitoring method according to claim 1, wherein said alarm signals of each said transmitting means are separately coded.

3. The security and monitoring method according to claim 2, wherein said coding is a separate 5-tone frequency sequence.

4. The security and monitoring method according to claim 1, wherein said alarm signals are produced during at least two of said delay intervals, and thereafter are produced in place of said monitoring signals at said fixed repetition rate.

5. The security and monitoring method according to claim 1, wherein said alarm signals are produced during at least two of said delay intervals.

6. The security and monitoring method according to claim 1, wherein said monitoring signals occur cyclically.

7. The security and monitoring method according to claim 1, wherein said synchronizing step is accomplished by the step of connecting said transmitting means to a master time-base circuit

8. The security and monitoring method according to claim 7, including the step of halting the sending of said monitoring and alarm signals when said transmitting means is connected to said master time-base circuit means.

9. The security and monitoring method according to claim 1, including the step of sending said alarm signals to said receiving means in place of said monitoring signals and at said fixed repetition rate.

10. A wireless security and monitoring system, comprising:

plural synchronized transmitting means for transmitting radio frequency signals according to a rigid timing schedule, each of said plural signal transmitting means being arranged to transmit in a first mode, said first mode being a monitoring mode wherein each said transmitting means transmits a monitoring signal having a duration which is a first fixed unit of time at a first repetition rate, said first repetition rate having a period which is a second fixed unit of time greater than said first fixed unit of time, each said transmitting means being further arranged to transmit each said monitoring signal at a point in time spaced from each said monitoring signal transmitted by other said transmitting means, each said monitoring signal being spaced from an immediately preceding monitoring signal transmitted by any other said transmitting means by a respective delay interval which is an integer multiple of a third fixed unit of time, so that all said monitoring signals will be free at all times of interference with said monitoring signals of other said transmitting means; and receiving means arranged for receiving said monitoring signals;

and wherein each of said plural transmitting means is further arranged to transmit in a second mode wherein an alarm signal having a duration which is a fourth fixed unit of time less than said third unit of time is transmitted at a second repetition rate greater than said first repetition rate, each said alarm signal being transmitted during a said delay interval at a point in time spaced a fifth fixed unit of time after transmission of a respective said monitoring signal from a respective said transmitting means so that all said alarm signals will be free at all times of interference with said monitoring signals of other of said transmitting means, said receiving means also receiving said alarm signals.

11. The wireless security and monitoring system according to claim 10, wherein each of said transmitting means includes presynchronized time-base circuit means for effecting an emitting of said monitoring and alarm signals at said spaced points in time to maintain said interference free relationship between said transmitting means.

12. The wireless security and monitoring system according to claim 11, wherein each of said time-base circuit means in each of said transmitting means includes a presynchronized oscillating quartz and a coded control stage series connected thereto for determining the mode of operation of said transmitting means, said time-base circuit means being arranged for specifying said points in time at which said monitoring signals and said alarm signals are to be transmitted so that said interference free relationship is maintained.

13. The wireless security and monitoring system according to claim 11, wherein said receiving means includes a master time-base circuit means which includes means for synchronizing each of said time-base circuit means in each of said transmitting means.

14. The wireless security and monitoring system according to claim 13, wherein each of said transmitting means includes a plug connection, wherein said receiving means includes a stowage board means with plug-in connection means for connection to said plug connection, said synchronizing means of said master time-base circuit means being arranged for effecting a synchronization of said time-base circuit means in said transmitting means when stowed on said stowage board means.

15. The wireless security and monitoring system according to claim 14, wherein said master time-base circuit means is arranged for synchronizing each said transmitting means to produce said monitoring signals at said points in time spaced from said monitoring signals and alarm signals of other said transmitting means.

16. The wireless security and monitoring system according to claim 10, wherein said transmitting means is further arranged to produce a said alarm signal in each of at least two sequential said delay intervals, said alarm signals being transmitted thereafter only at said first repetition rate and in place of said monitoring signals for the respective one of said transmitting means.

* * * * *

UNITED STATES PATENT AND TRADEMARK OFFICE

CERTIFICATE OF CORRECTION

PATENT NO. : 4,442,426

DATED : April 10, 1984

INVENTOR(S) : Frieder HEUSCHMANN and Albert PLANK

It is certified that error appears in the above-identified patent and that said Letters Patent is hereby corrected as shown below:

Col. 8, line 61; after "circuit" insert ---means which effects a synchronizing of a timing element on each of said transmitting means.---.

Signed and Sealed this

*Twenty-first* Day of *August 1984*

[SEAL]

*Attest:*

GERALD J. MOSSINGHOFF

*Attesting Officer* *Commissioner of Patents and Trademarks*